Figure 1:
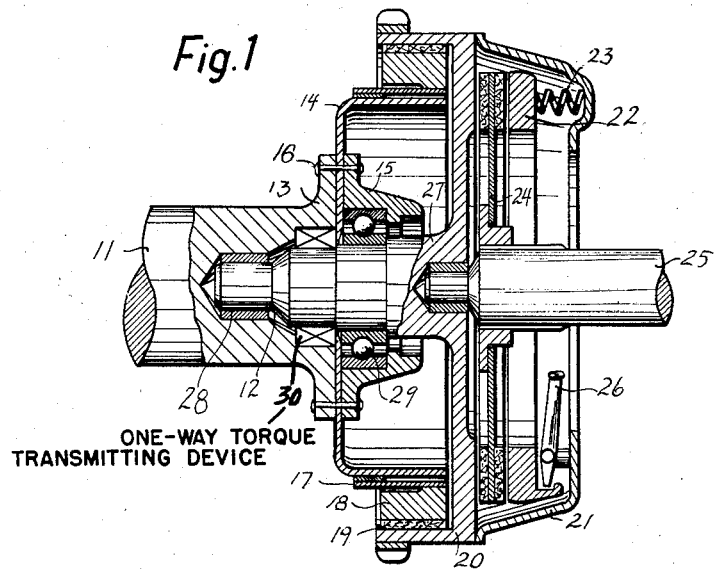

Aug. 25, 1959  F. J. VON BOMHARD ET AL  2,901,073
BEARING ARRANGEMENT FOR
CENTRIFUGAL AND AXIALLY
ENGAGING CLUTCHES
Filed Oct. 22, 1956

ONE-WAY TORQUE
TRANSMITTING DEVICE

ONE-WAY TORQUE
TRANSMITTING DEVICE

INVENTORS:
FRANZ JOSEF VON BOMHARD
KURT FADLER
By
Richardson, David and Vardon
Att'ys.

United States Patent Office 2,901,073
Patented Aug. 25, 1959

2,901,073

BEARING ARRANGEMENT FOR CENTRIFUGAL AND AXIALLY ENGAGING CLUTCHES

Franz Josef von Bomhard and Kurt Fädler, Schweinfurt am Main, Germany, assignors to Fichtel & Sachs A.G., Schweinfurt am Main, Germany, a corporation of Germany Application October 22, 1956, Serial No. 617,419

Claims priority, application Germany November 9, 1955

3 Claims. (Cl. 192—48)

The present invention relates to a novel centrifugal clutch for connecting the driving and driven shafts of a motor such as that of a vehicle. More particularly, it relates to a novel bearing arrangement for the driven member of such a centrifugal clutch.

In centrifugal clutches wherein weights are displaced as a result of centrifugal force to entrain a driven member, it is difficult to provide a suitable bearing arrangement for the driven member because of the need for making the overall clutch dimensions as small as possible. As a result, such clutches have generally been provided with a single bearing. While this is satisfactory for small vehicles provided with motors operating at low speeds, it has proven inadequate where larger loads are being driven and where quiet running is desired.

It is accordingly an object of the present invention to provide a suitable bearing arrangement for centrifugal clutches designed to transmit large forces at high speeds.

A further object of the invention is to provide a bearing arrangement ensuring quiet operation of centrifugal clutches.

Another object of the invention is to provide a centrifugal clutch having a reliable bearing structure but nonetheless taking up a minimum amount of space.

Still another object of the invention is to provide a centrifugal clutch with an effective bearing structure as well as with free wheeling means, all provided within a clutch of minimum dimensions.

These and other objects and advantages are realized in accordance with the present invention wherein a centrifugal clutch, though of minimum thickness, is provided with two bearings so the driven member runs smoothly in a trouble free manner. To this end the driven member is provided with a journal which extends into a suitable recess in the driving or crank shaft and rotates within a front bearing carried in said recess. A rear bearing for the journal is carried by the crank shaft flange directly or indirectly by the flywheel which is connected with the shaft and a free wheeling locking mechanism is arranged between the bearings. The outer raceway of the free wheeling mechanism can be provided either in the crank shaft itself or in a casing connected to the crank shaft and which may be integral with the means which supports the rear bearing. Where the casing is separate from the support for the rear bearing, both the casing and the support may be connected by the same bolts to the flywheel carried by the crank shaft.

Figure 2:
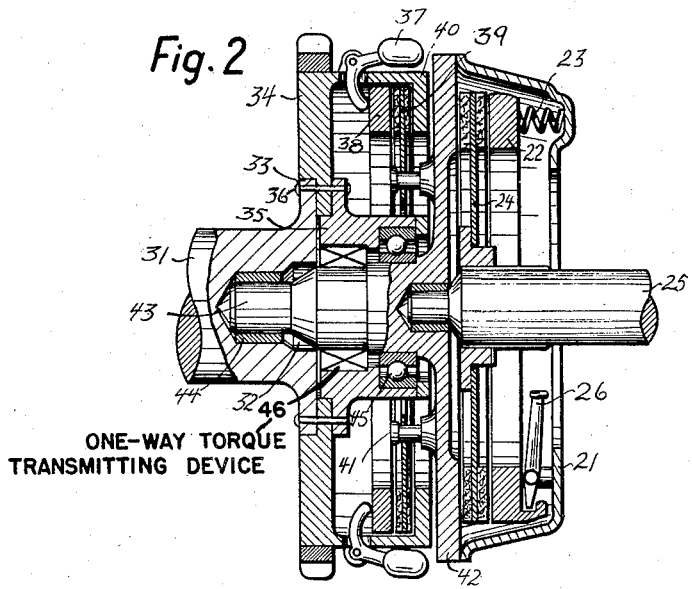

The invention will now be described more fully with reference to the accompanying drawing, wherein:

Fig. 1 is an axial section through a first clutch embodiment in accordance with the invention, some parts being shown in full; and Fig. 2 is an axial section through a second clutch embodiment.

Referring now more particularly to the drawing, in Fig. 1 there is shown a driving or crank shaft 11 provided with an axial bore 12 and having a laterally extending flange 13 at its end. A supporting member 14 and an annular casing 15 are secured to the flange 13 by bolts 16. Leaf springs 17 are secured at various locations about the periphery of the supporting member 14 and carry weights 18 provided with friction linings 19. A drum shaped driven member 20 surrounds the weights 18 and is normally spaced from the friction linings 19. When the driving shaft 11 rotates in excess of a predetermined speed, however, the weights are displaced centrifugally so that the friction linings contact driven member 20, as shown, and couple the crankshaft 11 to the driven member 20.

A cover 21 on the other side of member 20 houses a pressure ring 22 which is normally urged to the left by spring 23 so that friction disk 24 is held between member 20 and ring 22. Friction disk 24 is keyed to driven shaft 25 which extends into a bearing provided in member 20. In this manner, rotation of the member 20 effects rotation of driven shaft 25. A disengaging lever 26 is so mounted that upon operation by hand, by foot, electrically, mechanically, by suction or by pressure it will effect displacement of ring 22 to the right against the urging of spring 23. Friction disk 24 will then be released and shaft 25 will not be driven although member 20 is being rotated. This structure accordingly serves as a disconnecting clutch.

To ensure proper operation of the centrifugally actuated structure, it is of course necessary that member 20 be capable of perfect rotation without tilting or slight axial misalignment with the crankshaft 11, since otherwise uneven wear and noisy operation will result. To this end, member 20 is provided with an integral guide shaft 27 which at its front end rests slidably in a bearing 28 within the bore 12 of driving shaft 11. A rear anti-friction or ball bearing 29 for the guide shaft 27 is disposed within casing 15. Between the two bearings 28, 29 there is arranged a one-way torque transmitting mechanism 30, having its outer periphery or raceway formed in the shaft 11. This one-way mechanism 30 is so constructed that it locks in opposite direction to the normal direction of torque transmission of the motor thereby ensuring that the centrifugal coupling is relied upon only in one direction, and that transmission of power in the opposite direction always occurs through the one-way device. Specifically, transmission of power when the motor is being driven by the vehicle and acts as a brake takes place through the shaft 25, over the disconnecting clutch 21—26 to driven member 20 and guide shaft 27 directly to the crank shaft 11, i.e., via the raceway of the one-way torque transmitting mechanism 30.

In the centrifugal clutch shown in Fig. 2 the driving shaft 31 is also provided with an axial bore 32 and a laterally extending flange 33. A flywheel 34 and a casing 35 are connected to the flange 33 by bolts 36. Centrifugal weights 37 are pivoted on the flywheel and the inner ends thereof bear against a thrust ring 38. As the driving shaft rotates at increasing speed, the weights 37 swing outwardly under centrifugal force so that ring 38 is displaced to the right, thereby clamping friction disk 39 between ring 38 and cover 40. This causes disk 39 to rotate and pins 41 carry this rotation to driven member 42 which is a substantially flat plate.

The member 42 is provided with an integral forward shaft extension 43 which slidingly rests in front bearing 44 disposed within bore 32 of the driving shaft. A rear ball bearing 45 is housed within casing 35 and the casing also houses a one-way torque transmitting mechanism 46 disposed on the shaft 43 between bearings 44 and 45. This one-way mechanism, which is similar in construction and operation to mechanism 30 of Fig. 1, comprises a plurality of free wheeling spreading members arranged between smooth inner and outer raceways and locking in only one direction of rotation. In place of being housed in the same casing or recess as one of the bearings, the mechanism 46 can be housed in a separate casing and secured to the crank shaft or its flywheel by the same bolts which hold the casing for the rear bearing.

The disconnecting clutch elements 21—26 shown in Fig. 2 function in the manner indicated with reference to Fig. 1 and permit the driven shaft 25 to be uncoupled from the driving shaft even though the rotational speed of the driving shaft is sufficiently great to effect displacement of the centrifugal weights. This can conveniently be effected by an electrically operated mechanism controlled by a switch which is operated during actuation of the gear shift lever of the vehicle. In this manner the clutch is disengaged whenever the driver is shifting gears.

In spite of the fact that the clutch is quite narrow, there is ample room for two bearings and the locking mechanism due to the fact that the journal and at least the front bearing extend into the crank shaft. Thus, without increase in size, the clutch runs smoothly and quietly.

Various changes and modifications may be made without departing from the spirit and scope of the present invention and it is intended that such obvious changes and modfications be considered within the purview of the annexed claims.

We claim:

1. In a centrifugal clutch including a driving shaft and a driven shaft in axial alignment with said driving shaft, said clutch coupling said driving shaft to said driven shaft whenever the speed of said driving shaft exceeds a predetermined minimum speed, the provision of means defining an axially extending cylindrical aperture formed in said driving shaft coaxially therewith, said aperture being open at one end of said driving shaft, an intermediate clutch member having a shaft extension formed thereon which is received in said aperture coaxially with said driving shaft, a bearing disposed in said aperture in which said extension is slidably and freely rotatably guided, an anti-friction bearing mounted on said extension exteriorly of said aperture, said anti-friction bearing being connected to said driving shaft and to said intermediate clutch member for maintaining said extension and said driving shaft coaxially aligned independently of said first-named bearing, centrifugal weight actuated means driven by said driving shaft and engageable with said intermediate clutch member for coupling said driving shaft to said intermedaite clutch member when the speed of said driving shaft exceeds said minimum speed, a further clutch member connected directly to drive said driven shaft, spring pressed clutch means normally connecting said further clutch member for rotation with said intermediate clutch member, and means separate from said centrifugal weight actuated means for selectively controlling engagement and disengagement of said spring pressed clutch means.

2. In a centrifugal clutch including a driving shaft and a driven shaft in axial alignment with said driving shaft, said clutch coupling said driving shaft to said driven shaft whenever the speed of said driving shaft exceeds a predetermined minimum speed, the provision of means defining an axially extending cylindrical aperture formed in said driving shaft coaxially therewith, said aperture being open at one end of said driving shaft, an intermediate clutch member having a shaft extension formed thereon which is received in said aperture coaxially wtih said driving shaft, a bearing disposed in said aperture in which said extension is slidably and freely rotatably guided, an anti-friction bearing mounted on said extension exteriorly of said aperture, said anti-friction bearing being connected to said driving shaft and to said intermediate clutch member for maintaining said extension and said driving shaft coaxially aligned independently of said first-named bearing, centrifugal weight actuated means driven by said driving shaft and engageable with said intermediate clutch member for coupling said driving shaft to said intermediate clutch member when the speed of said driving shaft exceeds said minimum speed, a further clutch member connected directly to drive said driven shaft, spring pressed clutch means normally connecting said further clutch member for rotation with said intermediate clutch member, means separate from said centrifugal weight actuated means for selectively controlling engagement and disengagement of said spring pressed clutch means, and unidirectionally operative torque transmission means disposed intermediate said bearings, said transmission means permitting said driving shaft freely to overrun said intermediate clutch manner and connecting said intermediate clutch member to drive said driving shaft independently of said centrifugal weight actuated means when said intermediate clutch member would otherwise overrun said driving shaft.

3. In a centrifugal clutch including a driving shaft and a driven shaft in axial alignment with said driving shaft, said clutch coupling said driving shaft to said driven shaft whenever the speed of said driving shaft exceeds a predetermined minimum speed, the provision of means defining an axially extending cylindrical aperture formed in said driving shaft coaxially therewith, said aperture being open at one end of said driving shaft, an intermediate clutch member having a shaft extension formed thereon which is received in said aperture coaxially with said driving shaft, a bearing disposed in said aperture in which said extenson is slidably and freely rotatably guided, an anti-friction bearing mounted on said extension exteriorly of said aperture, said anti-friction bearing being connected to said driving shaft and to said intermediate clutch member for maintaining said extension and said driving shaft coaxially aligned independently of said first-named bearing, centrifugal weight actuated means driven by said driving shaft and engageable with said intermediate clutch member for coupling said driving shaft to said intermediate clutch member when the speed of said driving shaft exceeds said minimum speed, a further clutch member connected directly to drive said driven shaft, spring pressed clutch means normally connecting said further clutch member for rotation with said intermediate clutch member, means separate from said centrifugal weight actuated means for selectively controlling engagement and disengagement of said spring pressed clutch means, an axial extension on said driven shaft, said intermediate clutch member having a cylindrical aperture formed therein in which said last-named extension is received in axial alignment with said first-named extension, and a bearing disposed in said last-named aperture for maintaining said driving and driven shafts in axial alignment, said further clutch member being fixed to said driven shaft adjacent to said last-named extension.

References Cited in the file of this patent

UNITED STATES PATENTS

| | | |
|---|---|---|
| 2,038,450 | Roesch | Apr. 21, 1936 |
| 2,062,102 | Nutt et al. | Nov. 24, 1936 |
| 2,075,078 | Allen | Mar. 30, 1937 |
| 2,104,014 | Banker | Jan. 4, 1938 |
| 2,730,216 | Miller | Jan. 10, 1956 |